US008655341B2

(12) United States Patent
Boukai et al.

(10) Patent No.: US 8,655,341 B2
(45) Date of Patent: Feb. 18, 2014

(54) METHODS FOR MOBILE PHONE APPLICATIONS

(75) Inventors: Haim Boukai, Tel Aviv (IL); Sergey Ost, Rishon LeZion (IL)

(73) Assignees: Haim Boukai, Tel Aviv (IL); Sergey Ost, Rishon Lezion (IL)

( * ) Notice: Subject to any disclaimer, the term of this patent is extended or adjusted under 35 U.S.C. 154(b) by 119 days.

(21) Appl. No.: 13/001,106

(22) PCT Filed: Jun. 24, 2009

(86) PCT No.: PCT/IL2009/000632
§ 371 (c)(1),
(2), (4) Date: Dec. 23, 2010

(87) PCT Pub. No.: WO2009/156995
PCT Pub. Date: Dec. 30, 2009

(65) Prior Publication Data
US 2011/0111743 A1    May 12, 2011

Related U.S. Application Data

(60) Provisional application No. 61/075,037, filed on Jun. 24, 2008, provisional application No. 61/075,045, filed on Jun. 24, 2008, provisional application No. 61/075,052, filed on Jun. 24, 2008.

(51) Int. Cl.
*H04M 3/00* (2006.01)

(52) U.S. Cl.
USPC ........... 455/419; 455/418; 455/420; 455/466; 709/201; 709/202; 709/203; 709/206; 709/207; 717/174; 717/175; 717/176; 717/177; 717/178

(58) Field of Classification Search
USPC ................. 455/466, 418–420; 717/174–178; 709/206, 207, 201–203; 705/14, 26
See application file for complete search history.

(56) References Cited

U.S. PATENT DOCUMENTS

| | | | |
|---|---|---|---|
| 6,856,809 B2 * | 2/2005 | Fostick | 455/466 |
| 7,035,933 B2 * | 4/2006 | O'Neal et al. | 709/233 |
| 7,162,538 B1 * | 1/2007 | Cordova | 709/238 |
| 7,383,308 B1 * | 6/2008 | Groves et al. | 709/206 |
| 7,580,703 B1 * | 8/2009 | Veselov et al. | 455/414.1 |
| 7,779,409 B2 * | 8/2010 | Persson et al. | 717/178 |
| 7,881,976 B2 * | 2/2011 | Dayton et al. | 705/26.1 |
| 7,890,952 B2 * | 2/2011 | Marion et al. | 717/176 |
| 2003/0110094 A1 * | 6/2003 | Gulliver et al. | 705/26 |
| 2005/0096982 A1 * | 5/2005 | Morton et al. | 705/14 |
| 2006/0043164 A1 | 3/2006 | Dowling et al. | |
| 2006/0048141 A1 | 3/2006 | Persson et al. | |
| 2007/0255652 A1 | 11/2007 | Tumminaro et al. | |
| 2008/0022276 A1 | 1/2008 | Coppinger et al. | |
| 2008/0133650 A1 * | 6/2008 | Saarimaki et al. | 709/203 |
| 2008/0141242 A1 | 6/2008 | Shapiro | |

OTHER PUBLICATIONS

International Search Report dated Oct. 8, 2009 in corresponding International Application No. PCT/IL2009/000632.

\* cited by examiner

*Primary Examiner* — Olumide T Ajibade Akonai
(74) *Attorney, Agent, or Firm* — The Law Office of Michael E. Kondoudis (57) ABSTRACT

A set of systems and methods are described that: a) provides methods for viral mass distribution of mobile phone applications by use of phone book, contact lists, or other social network information, b) enable any Internet-enabled mobile device user to download and use such mobile applications without requiring PC access, and c) provides a technique for unifying code versions for most existing mobile devices, expediting the viral distribution of said applications.

18 Claims, 6 Drawing Sheets

METHODS FOR MOBILE PHONE APPLICATIONS

FIELD OF THE INVENTION

The present invention relates to methods for software distribution for mobile phones, and more particularly, systems and methods for viral distribution of mobile device applications (software, games, content, etc.) by use of contact lists, phone book, or other social network information. Here the term mobile device encompasses mobile telephones, PDAs, mobile computer and other mobile means having GPRS, 3G, Wi-Fi or other mobile data connectivity, and a unique CID or any other mobile terminal identification. Further methods are provided for transfer of phone applications such as international VoIP call applications, without the need for a PC or any other device with fixed internet connection. Finally methods are provided to unify code over a set of mobile platforms thus enabling compatibility with many hardware models reducing development time required for writing mobile applications, allowing easier implementation of the aforementioned techniques.

BACKGROUND OF THE INVENTION AND PRIOR ART

Viral marketing refers to marketing techniques that use pre-existing social networks to produce increases in brand awareness or to achieve other marketing objectives, such as product sales, through self-replicating processes involving the automated reproduction of multiple copies of data objects. Viral marketing can enable a business to enlarge its customer/user base or services at low acquisition costs. Furthermore, inviting new users or sending the application to new users can be done directly via a mobile application, the interne, etc. Viral distribution, as used herein, refers to distribution techniques using phonebooks or contact lists to distribute information, such as text messages, image messages, computer applications, mobile phone applications, etc., through self-replicating viral processes.

U.S. application Ser. No. 10/925,896, by Persson et al, provides a method and corresponding equipment by which software from a first device is distributed to a second device and possibly also a server. The software has provision for exchange of information between devices sufficient for the first device to determine whether it includes or stores a version of the software compatible with the second device, which if so is sent to the second device, and otherwise exchanges information with the second device sufficient for the second device to obtain a copy from the server. Similarly, U.S. Patent Application 20060048141, by Campbell provides a person to person mobile phone game distribution service that allows a person who has a mobile phone game or other application installed on their phone to send the game to someone else's mobile phone by building into the game the ability to send a link via using SMS, MMS or other messaging protocol. Both applications provide methods for distributing an application from one mobile device to another single device. However in neither case is there provision for mobile phone application distribution to multiple phone devices. Obvious solutions to such distribution scenarios are obviated due to various hidden difficulties, such as the fact that multiple versions of a given application are generally required for use with various different mobile phone models, which in general utilize different hardware and operating systems, necessitating different software versions for each different phone. This imposes software version complexity and constrains the methods of application distribution; for example, the end-user usually provides the phone brand and model via another communication means such as fixed Internet connection, call representative or IVR, a physical visit to a retail location, etc. Only then the mobile application provider provides the user with an appropriate version of a given application that will operate correctly on the user's mobile phone. Furthermore the end-user or service provider usually does not directly send or transfer the application to another new user due to the fact the new user must in some way indicate the phone brand and model he owns via some means.

A related problem is that many advanced mobile phone users have limited or no PC access. As of the beginning of 2009, 2.4 billion people use. Internet-enabled mobile phones. In comparison, 1.3 billion people have access to the Internet via personal computers (PCs). This indicates that there are at least 1.1 billion people that have no net-enabled PC access but do have Internet-enabled mobile phones. This constitutes a large 'invisible' market for mobile applications (including software, clients, and the like, hereinafter referred to as "mobile applications") such as software to make VoIP, or local calls, send SMS, Instant Messaging (IM), send photos and files, play games, use maps, find locations of other users, or any of the plethora of other mobile applications now being devised in this fecund, protean field of innovation. Users of mobile applications are required by the applications providers to access the Internet via PC (or to call a phone representative/IVR or to attend retail location, etc.) in order to open accounts, invite/receive invitations to/from other users, send mobile applications, make payments, check account costs and balances, set various options, etc.

A final, intimately related issue is the limited portability of many web applications. Most mobile phones today support the Java platform/virtual machine, which in principle provides a common environment for running games and other applications on mobile phones (and other embedded devices, PDAs, TV set-top boxes, printers, etc.). There are many mobile phones manufacturers: Nokia, Sony-Ericsson, Samsung, Motorola, LG etc., that ostensibly support a unified standard version of Java, but due to the fact that each manufacturer uses a different OS (operating system), different UI (user interface), different GUI (graphical user interface), different drivers for each functionality, etc., for each mobile device or for each series of mobile devices, the realization of the Java virtual machine in each device may in fact be sensibly different from other realizations, and as a result there are differences in Java functionality on various mobile devices models, both in terms of results of different functions and availability of different functions.

Hence, mobile application/software developers need to fit the mobile application to the various models or series by creating a different version of the application for each model, which require constant development and maintenance resources and effort to comply with new phone models which are launched into the market frequently. There is therefore a need and it would be advantageous to have a universal application that will run on substantially all Java enabled mobile phones or devices, and a means for distribution of such, preferably using viral means that does not require PC access.

SUMMARY OF THE INVENTION

According to the teachings of the present invention there are provided systems and methods for viral distribution of mobile phone applications, preferably written in device-independent form, that do not require PC access. The system in some embodiments includes a server which provides mobile services. The server includes an applications database, a clients' database and an application distribution unit. The mobile phone of the user includes an installed application which works in coordination with the server. The mobile phone further includes a memory containing address book, in which the user of mobile phone keeps the phone numbers of the user's acquaintanceship. The application extracts at least a portion of the phone numbers of the user's address book and transmits it to the server. The application distribution unit of the server contacts the unregistered users in the list and invites them to install an application. A user that accepts the invitation and installs the provided application becomes a registered client. The present invention is described in terms of Java based applications that operate on mobile phone devices, but the invention is not limited to Java based applications that operate on mobile phone devices, rather including all relevant programming languages and mobile devices.

It is a related object of the present invention to provide a method and system which enables all Internet-enabled mobile users (2.4 billion currently) to use mobile applications which contain everything the end-user needs in order to use and operate a service from within the application without need of a PC or fixed internet connection. These operations include but are not limited to the opening of accounts, sending/receipt of invitations, sending of mobile applications, making mobile payments via credit card, calling card PIN or other money transfer mechanism, the checking of various costs and balances, setting of various options, and the like. All activities relating to the mobile application are performed directly from the mobile application without any need to surf the Internet via a PC, a mobile phone or any other device with Internet browser, nor to call phone representative/IVR or to attend retail location, etc.

Particularly relevant mobile device applications include inter alia the following services:
1. Inviting new users to join the service;
2. Automatic account opening;
3. Application downloading via link from message, SMS, MMS, Service message (WAP push), etc;
4. Placing calls anywhere, locally and internationally, possibly using VoIP technology;
5. Checking call cost and user account balance;
6. Payment using credit card or PIN and calling card code;
7. Transfer of money from one user to another;
8. Sending and receiving of SMS, Instant Messaging (IM), photos and files; and
9. Redirecting calls to another number.

According to teachings of the present invention there is provided a system for providing one or more services for mobile devices with one or more pure mobile applications, according to embodiments of the present invention. The system includes a server which includes a front filter module to send/receive requests to/from a user mobile phone, an authentication engine to filter authorized/not authorized requests requesting services from the server. Preferably, the server further includes an encryption/decryption engine to encrypt outgoing data and decrypt incoming data and a database which holds all customers' related information. The server may further include a call routing module for executing callback services and a billing engine for performing billing related issues.

An aspect of the present invention is to convert the user's mobile phone to a kind of "remote terminal" that connects to the server and uses the server resources to manage the service provided by the server. (Typically, the browser activated on the user's mobile device allows performing most tasks to operate the service). However, the "terminal" is tuned to perform specific functions, and has its own database where it can store information needed for operating the application and can process various tasks (such as encryption of requests sent via internet or encryption of voice) which are limited only by the power of the mobile phone processor.

According to the teachings of the present invention there is furthermore provided a method for writing a device independent application, operable on substantially all mobile phones or devices. The method includes using only commands that are operable on substantially all Java enabled mobile phones or devices. Further objects and advantages will become apparent from a consideration of the ensuing description and drawings.

BRIEF DESCRIPTION OF THE DRAWINGS

The present invention will become fully understood from the detailed description given herein below and the accompanying drawings, which are given by way of illustration and injector example only and thus not limitative of the present invention.

DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided, so that this disclosure will be thorough and complete, and will fully convey the scope of the invention to those skilled in the art. Unless otherwise defined, all technical and scientific terms used herein have the same meaning as commonly understood by one of ordinary skill in the art to which this invention belongs. The methods and examples provided herein are illustrative only and not intended to be limiting. All materials suggested or mentioned are provided by way of example only, with no limitation.

The term 'SIP' hereinafter refers to Session Initiation Protocol.

The term 'PBX' hereinafter refers to Private Branch Exchange.

The term 'VoIP' hereinafter refers to voice over IP, a system for routing voice traffic over the internet.

The term 'networked mobile device' hereinafter refers to any mobile device with internet connectivity, and computing capability, such as a netbook or notebook with wireless, WiMax, or Bluetooth connectivity, a mobile phone, a 3G cellphone, smartphone, PDA other mobile means having GPRS, and a unique CID or any other mobile terminal identification such as MAC address, IP address, or the like.

By way of introduction, one principal intention of the present invention includes providing a system and method for viral distribution of mobile phone applications, which does not require PC access. Such applications may preferably but not necessarily be device-independent applications.

Figure 1:
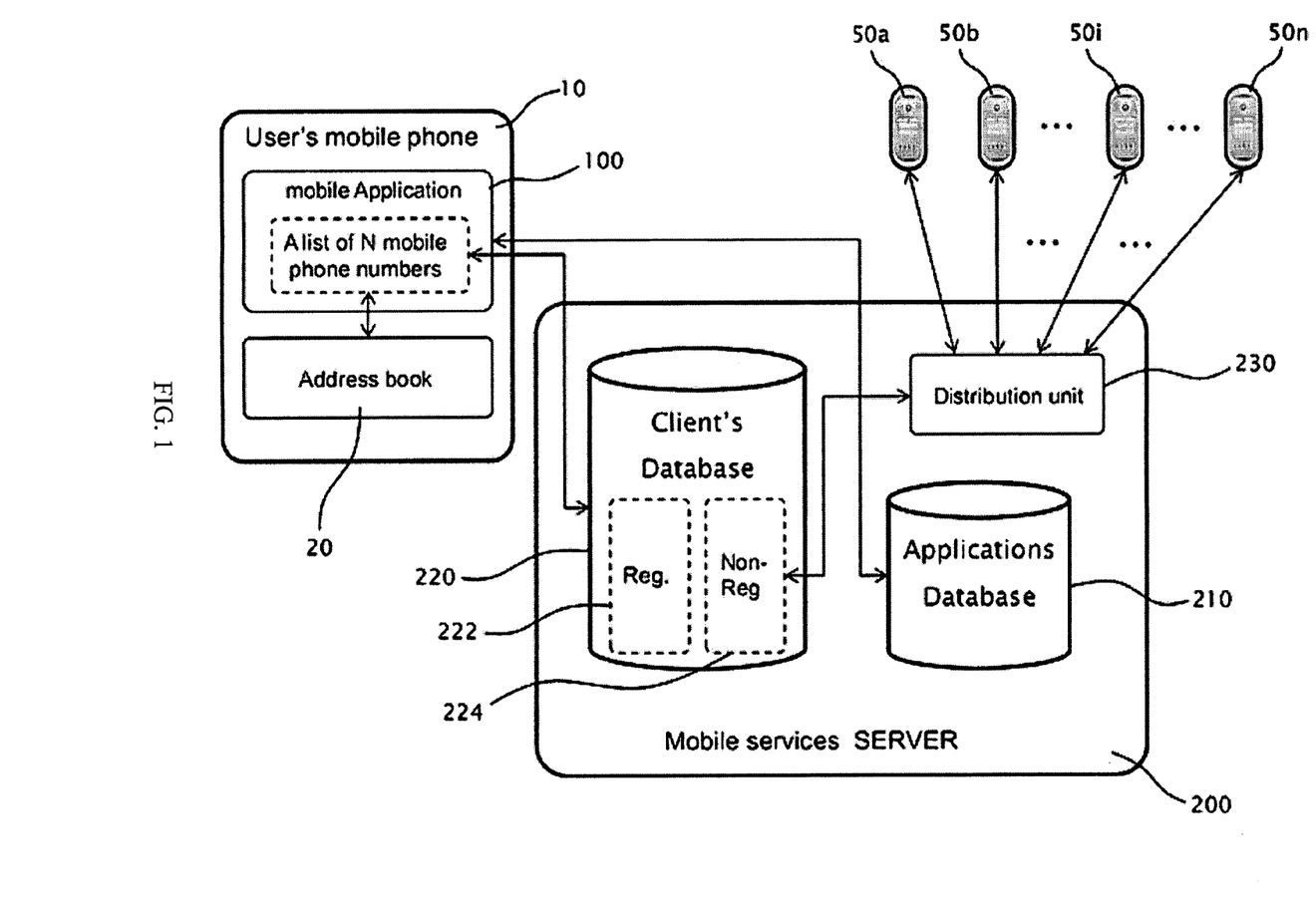
FIG. 1 is a schematic block diagram of a viral software application system, according to embodiments of the present invention.

Reference is now made to FIG. 1, which presents a schematic block diagram of a viral software application system, according to embodiments of the present invention. In the example shown in FIG. 1, mobile phone 10 is a registered client of server 200, which provides mobile services, for example, international calls services using VoIP. Mobile phone 10 includes installed application 100 which runs independently on mobile phone 10 and works in coordination with server 200. Mobile phone 10 further includes a memory containing address book 20, in which the user of mobile phone 10 keeps the phone numbers of his acquaintances. Server 200 includes an applications database 210, a client's database 220 and an application distribution unit 230. Client's database 220 is subdivided into a registered clients sub database 222 and non-registered clients sub database 224. Applications database 210 includes all applications required to be installed in client's mobile phones 10, in order to provide the available mobile services. Application distribution unit 230 can contact other users 50 in order to invite them to install application 100 or any other application. Typically, user 50 that accepts the invitation and installs the provided application becomes a registered client. Typically, mobile phone applications are based on the Java J2ME (Java 2 Micro Edition) platform which is known in the art. Hence, Java based applications can be distributed to Java enabled mobile phones, which at this point in time includes the majority of mobile phones used. An aspect of the present invention is to provide a viral marketing distribution method based for example on a Java application, which enables rapid distribution of said application. This will in principle enable rapid growth for a business, e.g. by enlarging its customer base or the like, at low customer acquisition costs. The application can be spread virally for example by inviting new users in a given user's social network, phone list, or the like. Contacted people who likewise become system users likewise send the application to members of their social networks, leading to an exponential growth of potential users.

Figure 2:
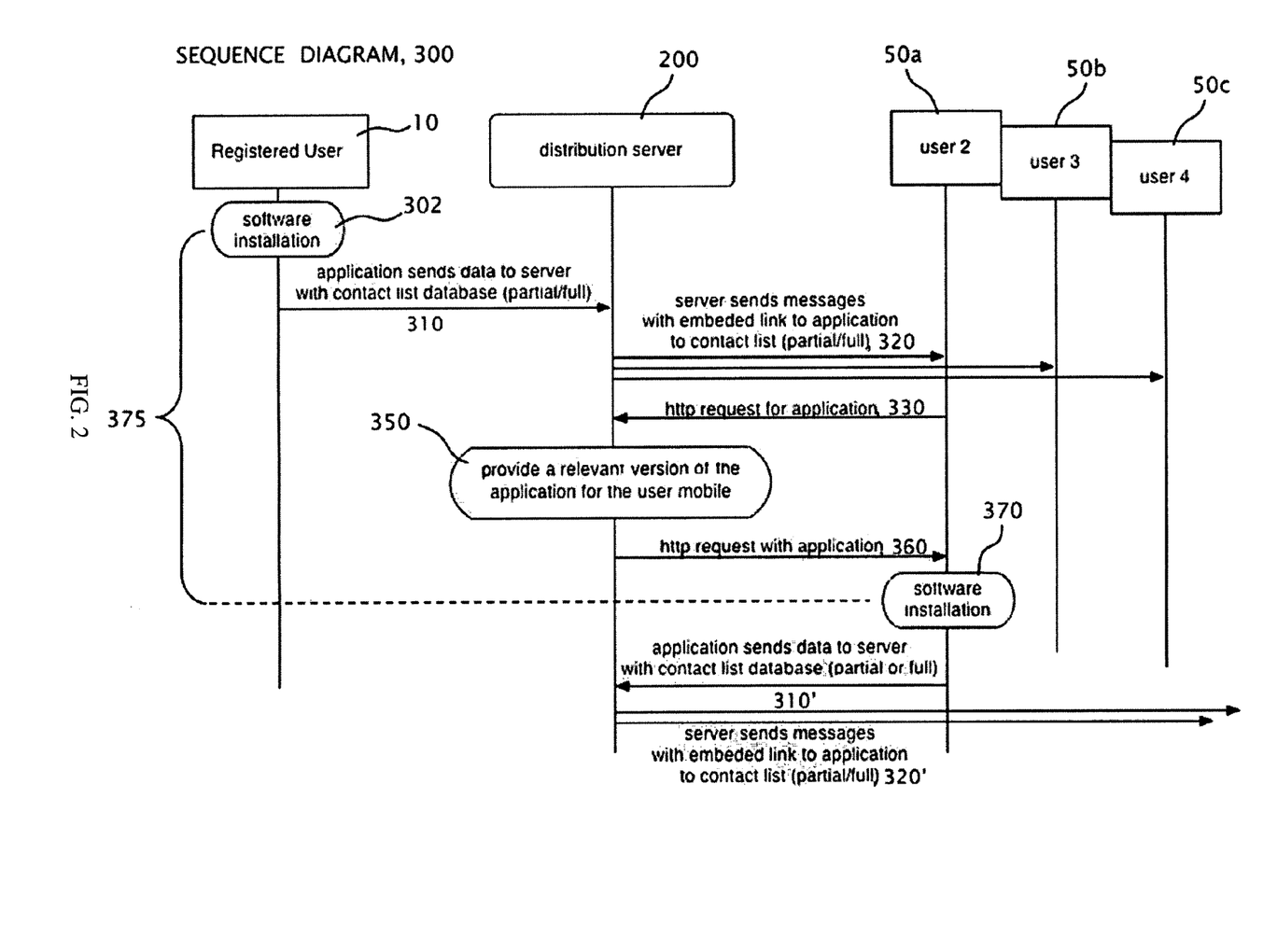
FIG. 2 shows a sequence diagram of the transmission of a software application, according to embodiments of the present invention.

The viral marketing distribution process is illustrated in sequence diagram 300 of the transmission of a software application, shown in FIG. 2. User 10 installs (step 302) application 100 (in FIG. 1) and thereby becomes a registered client of server 200, and is subsequently added to a registered clients sub-database 222. Application 100 inquires of user 10 whether application 100 can extract some portion of the user's address book 20 (stored in the mobile device of user 10.) Application 100 may use any portion of list 20 for the tasks performed by application 100. In the next step 310 of the process, application 100 transmits list 20 to the distribution server 200. Server 200 sorts the transferred portion(s) of list 20. Already-registered users appearing on list 20 are discarded, while unknown users are added to a non-registered clients sub database 224. In the next step 320 of the process, server 200 sends messages, with (for example) embedded links to application 100, to at least a portion of unregistered users 50a-c on list 20. Server 200 activates application distribution unit 230 (FIG. 1), which in turn sends messages, with embedded link to application 100, to at least a portion of unregistered users 50a-c on list 20. The message is selected from a group of messaging protocols, including: WAP PUSH, SMS (text messaging), ESMS, MMS, email, instant messaging or any other messaging protocol known in the art.

In a first embodiment, when application 100 is written as Universal/Generic. Software that fits all mobile devices (to be discussed in depth below). Server 200 sends a link to users 50 to download application 100. In a second embodiment, when application 100 is written for a particular mobile device or group of mobile devices, server 200 provides the appropriate specific application 100 that will run on the mobile device of a specific user 50. In the next step 330 of the process, unregistered user 50a optionally accepts the invitation to install application 100. If user 50a accepts the invitation to install application 100, a file such as a JAD file, .jar file, or the like is returned to server 200. The following step 350 has the server 200 provide a relevant version of application 100 to user 50a. In the first embodiment, (when application 100 is written as Universal/Generic Software that runs on most or all mobile devices), server 200 sends a link to user 50a to download application 100, which fits all mobile devices. In the second embodiment, (when application 100 is written in a specific device/group-of-devices Software), server 200 sends a link to user 50a to the website of the provider of application 100, wherefrom user 50a can download application 100.

When user 50a clicks on the link, which is contained for example in an SMS message, a browser optionally may open automatically, and the server 200 receives from the browser of user 50a various information, such as:
 a. IP Address. Typically, for mobile phones it is the IP address of the mobile service provider.
 b. The mobile device browser identification (Headers or 'fingerprint' information, including for instance device type and/or model).
 c. Other information such as: mobile device model, brand, IMEI etc.

This information is currently provided as part of standard web communication protocol, but is in general not used for purposes of mobile device identification as disclosed herein. In standard web communication protocol there is generally provided a 'fingerprint' containing information including device type/model or other identification, which the current invention exploits to determine version requirements for software. In this way the user does not have to indicate device version information, as it is determined automatically.

Server then 200 analyzes the received information to determine the type of application 100 that is compatible with the device of user 50a. For example, server 200 can use the IP Address of the device of user 50a to send application 100 in the right language according to the location of the mobile operator (for example: sending application in the French language to users with IP address of Orange France). Another example, server 200 can use the browser identification to send a compatible application to an iPhone, which does not run Java.

STEP 360: Server 200 provides the appropriate version of application 100 to user 50a.

STEP 370: Application 100 is installed on the mobile phone of user 50a.

STEP 310': Application 100 transmits a list of potential users extracted from user 50a's address book, stored in the mobile phone of user 50a, to server 200.

STEP 320': Server 200 sends messages, with (for example) an embedded link or links to application 100, to at least a portion of unregistered users 50 on the list of potential customers extracted from the address book stored in the mobile phone of user 50a.

From here, the process may repeat restarting at step 370 for each of the new users who have been contacted, branching out until all addresses in all phone books reachable have been attempted.

It should be noted that steps 302-370 complete a full distribution cycle 375.

In certain embodiments of the present invention, server 200 keeps track of the number of invitations a particular unregistered user has been sent to install a given application 100. If user 50 rejects the invitation more than some threshold number of invitations, the server 200 stops sending invitations to install application 100 to user 50.

Figure 3:
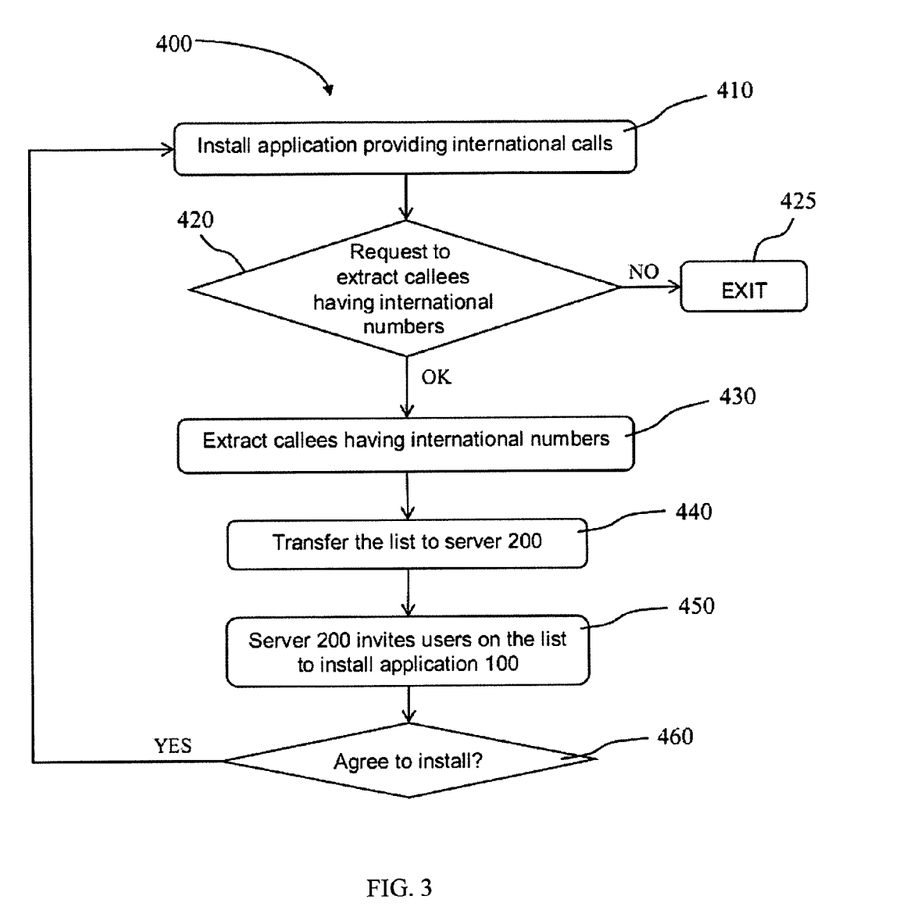
FIG. 3 is a schematic data flow of an example application for providing international calls.

In an example application, application 100 provides international calls services. The example is schematically illustrated in FIG. 3.

Here we illustrate further steps as follows.

STEP 410: Application 100 (of FIG. 1) is installed on the mobile phone of user 10.

STEP 420: Application 100 inquires user 10 to extract the callees having international phone numbers from the address book of user 10.

STEP 425: If user 10 denies the request, exit.

STEP 430: If user 10 agrees, application 100 extracts the callees having international phone numbers from the address book.

STEP 440: Application 100 transmits the extracted list to server 200.

STEP 450: Server 200 sends messages, with embedded link to application 100, to at least a portion of unregistered users 50 on the extracted list, inviting users 50 to install application 100 on their mobile phone.

STEP 460: If user 50 agrees, go to step 410.

It is further within provision of the present invention to provide a method and system to allow all Internet-enabled mobile service users (2.4 billion currently) to utilize certain mobile applications which contain everything the end-user needs in order to use and operate a set of services including, but not limited to, opening an account, inviting/receiving, and sending mobile applications, making mobile payments (via credit card, calling card PIN or prepaid card code & transfer money), checking costs and balances, setting various options, and the like. As described; one key application is provision of international calling service over VoIP or other networked service, to avoid standard long distance fees. As described herein, such provision is made without requiring use of a PC, allowing the services to be offered to any net-enabled cellphone user.

Figure 4:
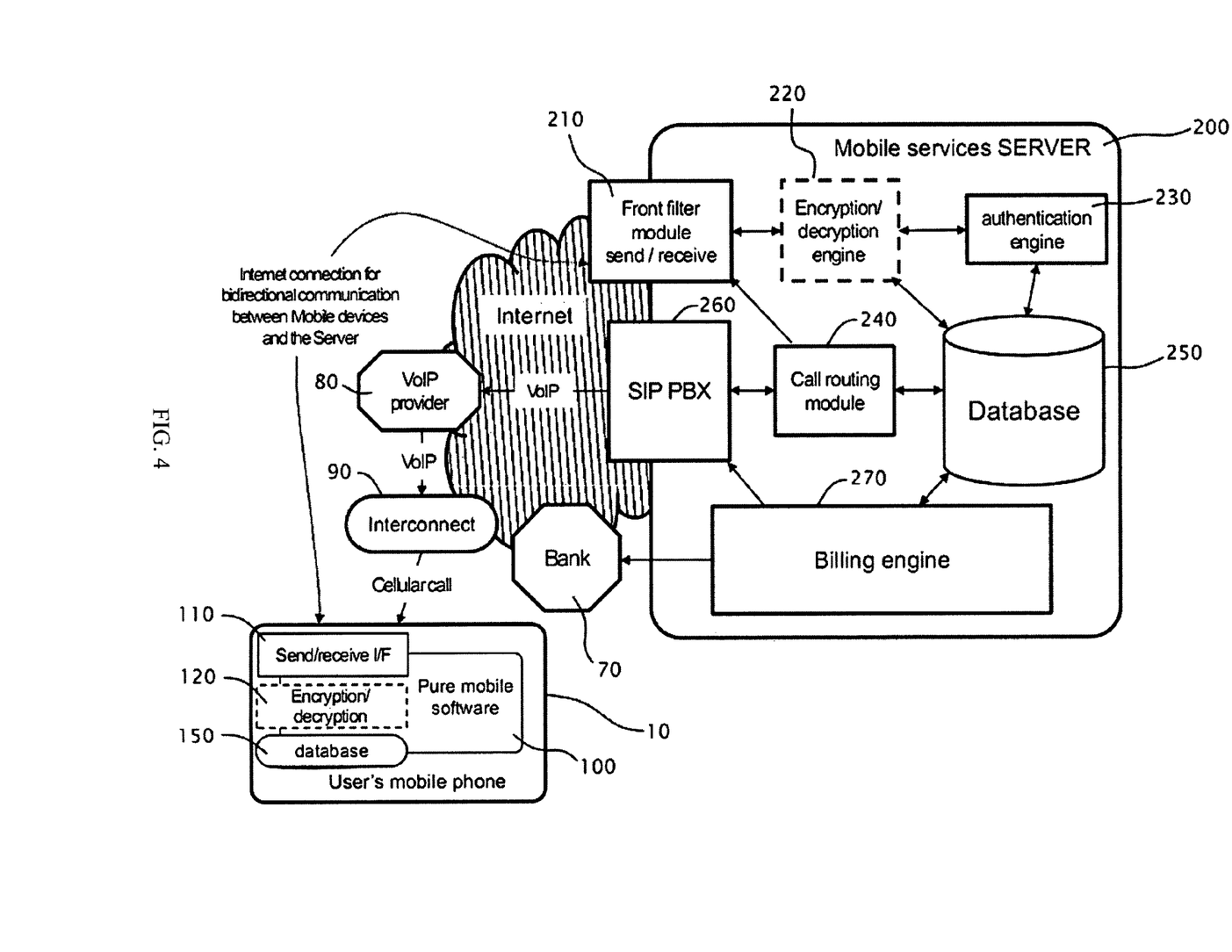
FIG. 4 is a schematic illustration of a system providing one or more services to a mobile phone with one or more pure mobile application, according to embodiments of the present invention.

Reference is now made to FIG. 4, which is a schematic illustration of a system for providing one or more services to a mobile phone with one or more pure mobile application, according to embodiments of the present invention. The mobile services system includes server 200 with front filter module 210 that sends/receives calls to/from a user mobile phone 10. Also included is an authentication engine 230 to handle incoming calls requesting services from server 200. Preferably, server 200 further includes an encryption/decryption engine 220 to encrypt outgoing data and decrypt incoming data. Preferably, server 200 further includes database 250 which holds all customers' related information. Preferably, server 200 further includes call routing module 240 for executing callback services, billing engine 270 for performing billing related services and SIP-PBX 260 (PBX—Private Branch Exchange; SIP—Session Initiation Protocol) which is a privately owned telephone switching network based on Voice over IP (VoIP) to enable telephony over the internet, involving multimedia elements such as video, voice, chat, gaming, and virtual reality. VoIP 80 provider routes calls to the destination. When user 10 places a request for a call PBX 260 receives a command to dial a certain number, the call is routed through provider 80 which routes it, optionally, through Interconnect 90, when a VoIP call from internet is converted into regular call via regular lines over a GSM network.

On the user's side, the user's mobile phone 10 in one embodiment includes 'pure' mobile software which is typically a Java platform that is targeted at small, standalone or connectable consumer and embedded devices. The pure mobile software technology consists of a virtual machine and a set of APIs suitable for tailored runtime environments for these devices. The pure mobile software technology has two primary kinds of components—configurations and profiles. Mobile phone 10 further includes send/receive module 110 and database 150 including user's related information and the applications that enables using services provided by server 200. Mobile phone 10 preferably further includes encryption/decryption module 120 to encrypt outgoing data and decrypt incoming data. Receiving module 210 is typically a software program, which resides on one of the open ports of server 200 and "listens" (waiting) to commands which are sent from the a user's mobile phone 10 by software 100. When "garbage" data or non authorized command is sent to server 200, it is simply ignored. After a recognized incoming request is received by server 200 the request is decrypted and then checked against the user related information in database 250 to see if the user who sent the command is an authorized user. If the sender is positively authenticated, server 200 runs a number of internal operations to handle the incoming request. Server 200 interprets the command into a relevant list of tasks required to provide the service associated with the command received from mobile phone software 100. In this case, software 100 running on mobile phone 10 serves as a terminal of server 200, which handles a number of tasks to fully provide the service. For each different service request sent the server 200 a different list of operations may need to be performed.

Figure 5:
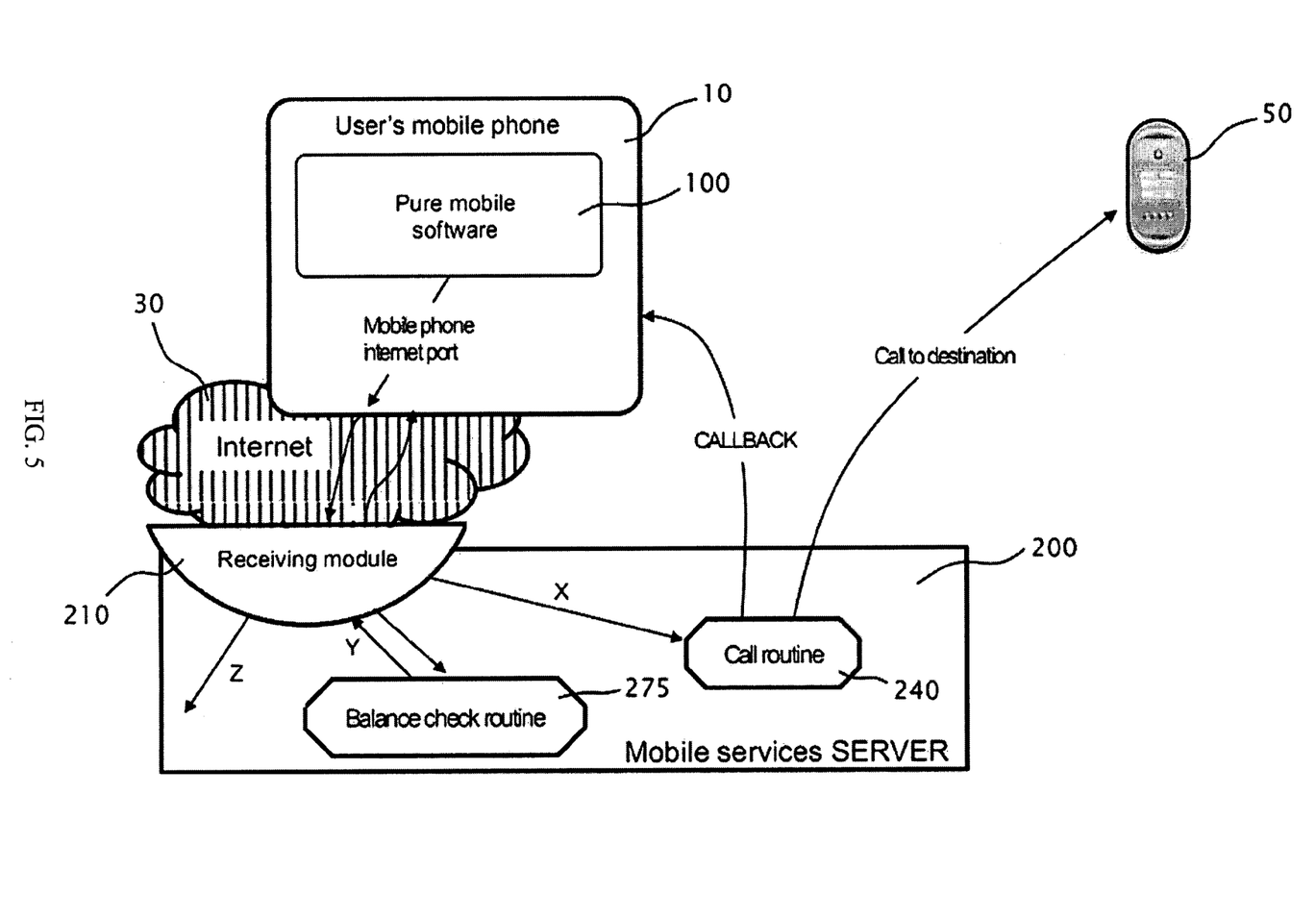
FIG. 5 is a schematic illustration of example pure mobile application to services provided by the system shown in FIG. 4.

Reference is now made to FIG. 5, which is a schematic illustration of example pure mobile application to services provided by server 200. The difference in the tasks performed by different service requests are exemplified in the following examples.

EXAMPLE 1

A request is made to "call number: +1-123-1234567" (request for service X in FIG. 5). Server 200 performs the following tasks:
a. receive the request for service from via internet 30;
b. optionally, decrypts the request;
c. authenticate the customer using database 250;
d. checks if the customer has enough money in the account;
e. send a request to PBX to perform a callback to the customer; and
f. as soon as the customer answers, calls to desired destination 50.

EXAMPLE 2

A request is made to "view balance" in a user's account (request for service Y in FIG. 5). Server 200 performs the following tasks:
a. receive the request for service from via internet 30;
b. optionally, decrypts the request;
c. authenticate the customer using database 250;
d. check the customers' balance using balance check module 275; and
e. send a requested data back to mobile phone software 100 via an opened port.

It should be noted that when "http" protocol is used, the java application sends a command via POST command and receives an answer from server 200 with the balance data, the balance is shown to customer via the java interface. Billing engine 270 handles all the requests that are involved with money transactions. Billing engine 270 is used to compute and keep track on the balance of the account of a user, add the cost of placed calls, send SMS, messages, make money transfers to other users, etc. Typically, the user makes a deposit into the users account with the service provider, for example with a credit card, using the application installed on the user's mobile phone. When billing engine 270 receives a request to add money to an account it sends a request (for example, sends credit card details) to the appropriate bank (or to the bank gateway) for authorization and if authorized, charges the credit card and deposits a relevant amount of money into the user's account.

When the user uses a prepaid card, billing engine 270 checks if the card is valid and deposits the relevant amount of money into user's account.

Another provision of the present invention includes providing a method for writing a device independent application. This can be for instance a Java based application, operable on substantially all Java enabled mobile phones or devices. The method comprises using only commands that are operable on substantially all Java enabled mobile phones or devices. By using only the common parts of the actual realization of Java on all the various mobile devices, one in effect implements a Universal Mobile Java Application, which operates correctly on substantially all mobile platforms that support Java. This includes the majority of existing mobile phones.

Figure 6:
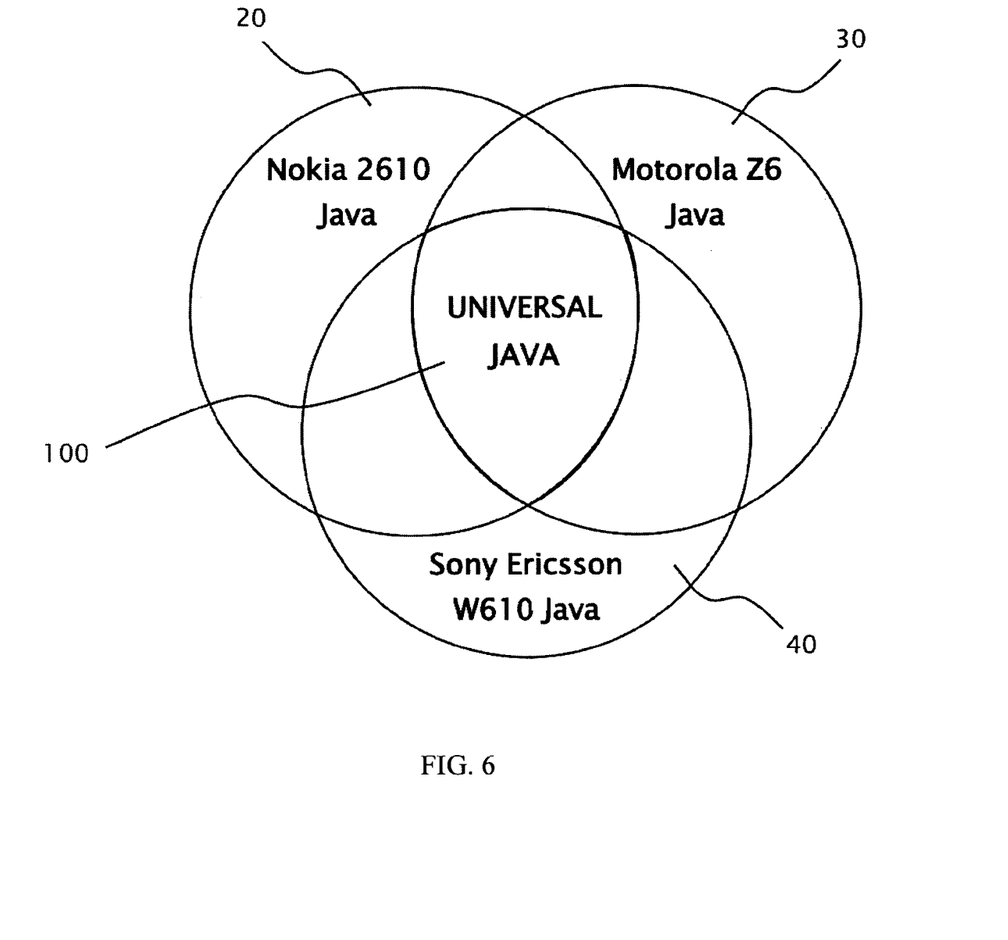
FIG. 6 is a schematic illustration of the common parts of the actual realization of Java on various mobile phones.

Reference is made to FIG. 6, which is a schematic illustration of the common parts of examples the actual realization of Java (20, 30 and 40) on various mobile phones, thereby creating a Universal Mobile Java application 100 which operates correctly on substantially all mobile phones that support Java, according to an embodiment of the present invention. In the example shown in FIG. 6, some Nokia mobile phones typically use the Nokia 2610 Java language, some Motorola mobile phones typically use the Motorola Z6 Java language and some Sony/Ericsson mobile phones typically use the Sony/Ericsson W610 Java language. The application commands, that are valid in substantially all commonly used Java based applications, form the set of commands used by the Universal Mobile Java language of the present invention. Furthermore, the Universal Mobile Java applications typically use the original UI and GUI provided by the mobile phone maker. Thus, according to aspects of the present invention, the output screens provided by a Universal Mobile Java application will look, graphically, similar to other applications running on a specific mobile phone and provided by that mobile phone maker. The Universal Mobile Java language of the present invention enables developers to create applications to provide mobile services described above such as making VoIP calls or regular calls, sending SMS, Instant Messaging (IM), sending photos and files, sending mobile application, making payments via credit card or code, checking costs and balance, etc. An aspect of the present invention is to enable a mobile application/software developer to substantially reduce the development and maintenance resources and efforts, not having to develop different software versions for each existing mobile device model or series, or for each of the new phone models that are frequently launched into the market.

To summarize, a universal mobile application may be sent to substantially all users with Java enabled mobile devices. Universal mobile applications enable mobile phone services providers to offer services such as inviting new users, phone number authentication and automatic account opening for new users. Other mobile phone applications include providing low cost VoIP or regular calls, sending SMS, Instant Messaging (IM), sending photos and files, etc.

The invention being thus described in terms of embodiments and examples, it will be obvious that the same may be varied in many ways. Such variations are not to be regarded as a departure from the spirit and scope of the invention, and all such modifications as would be obvious to one skilled in the art, are intended to be included within the scope of the patent application.

The embodiments chosen are provided, so that this disclosure will be thorough and complete, and will fully convey the scope of the invention to those skilled in the art. Unless otherwise defined, all technical and scientific terms used herein have the same meaning as commonly understood by one of ordinary skill in the art to which this invention belongs. The methods and examples provided herein are illustrative only and not intended to be limiting. All materials suggested or mentioned are provided by way of example only, with no limitation.

The invention claimed is:

1. A method for viral distribution of applications on networked mobile devices comprising steps of:
   a. installing software on said networked mobile devices,
   b. reading, by means of said software, some portion of a contact list stored on said networked mobile devices;
   c. transmitting said portion of said contact list to a server;
   d. sending invitation to install said software to unregistered users from said portion of said contact list;
   e. installing said software on some portion of those networked mobile devices listed on said contact list upon accepting of said invitation to install said software;
   f. repeating steps b-e for each contact on each of said networked mobile devices, whereby viral distribution of software across a multitude of networked mobile devices is achieved; and
   g. providing a server, adapted to provide said software running on said networked mobile device working in coordination with said server by means of an applications database, a client's database and an application distribution unit, said client's database being subdivided into registered clients sub database and unregistered clients sub database, said applications database including all applications required to be installed in client's mobile networked devices, said application distribution unit being adapted to contact unregistered users in said unregistered clients sub database to invite some part of said unregistered users to install said software.

2. The method of claim 1, where said step of installing said application is accomplished by means selected from a group consisting of: determining mobile device type and model; sending an SMS message; sending an SMS message containing a link to a location of said application allowing subsequent download of said application; sending an SMS message containing said application; sending an MMS message; sending an MMS message containing a link to a location of said application allowing subsequent download of said application; sending an MMS message containing said application; sending an email message; sending an email message containing a link to a location of said application allowing subsequent download of said application; sending an email message containing said application; sending an Instant Message; sending an Instant Message containing a link to a location of said application allowing subsequent download of said application; sending an Instant Message containing said application; sending a service message; sending a service message containing a link to a location of said application allowing subsequent download of said application; sending a service message containing said application; sending a WAP push message; sending a WAP push message containing a link to a location of said application allowing subsequent download of said application; sending a WAP push message containing said application; and sending said application from one networked mobile device to a second networked mobile device.

3. The method of claim 1, where said application is implemented on a subset of programming language comprising functions that are valid on networked mobile devices.

4. The method of claim 1, where said application comprises means for actions selected from the group consisting of: VoIP calls, regular cellular calls, sending SMS messages, sending Instant Messaging (IM) messages, sending photos, sending files, and sending email.

5. The method of claim 1, where said server or application comprises means selected from a group consisting of: means for encrypting and decrypting all communications used thereby; means for inviting new users to use said application; automatic account opening; application download via link from a source selected from the group consisting of: email message, SMS, MMS, Service message, and WAP push; means for placing calls anywhere locally and internationally; means for checking all cost and account balance; payment using means selected from the group consisting of credit card, PIN, and calling card code; transfer of money from one user to another; means for sending and receiving SMS, Instant Messaging (IM), photos and files; means for redirecting calls to another number; means for sharing photos; means for sharing files; and means for sharing content, wherein useful additional networked connectivity is provided to users without requiring use of a personal computer (PC).

6. The method of claim 1, wherein said server 200 is additionally adapted to perform tasks selected from a group consisting of:
receiving service requests via the internet 30;
decrypting said requests; authenticating the customer using database 250;
checking the customers' balance using balance check module 275;
sending requested data back to networked mobile device software 100;
sending a request to private branch exchange(PBX) to perform a callback to the customer; and
directing calls to desired destination 50.

7. The method of claim 3, where said language utilizes the original user interface (UI) and graphical user interface (GUI) available to a given networked mobile device.

8. The method of claim 7, wherein said application comprises means for actions selected from the group consisting of: VoIP calls, regular cellular calls, sending SMS messages, sending Instant Messaging (IM) messages, sending photos, sending files, and sending email.

9. The method of claim 2, wherein said server 200 is additionally provided with a billing engine 270 adapted to perform all requests requiring monetary exchanges, said billing engine adapted to compute and keep track of user balances, compute and add costs of placed calls, send SMS messages, make money transfers to other users.

10. A system for viral distribution of applications on networked mobile devices, comprising:
a. application running on said networked mobile devices;
b. a database storing a contact list of said networked mobile devices;
c. means for sending invitation to install said application on some portion of those networked mobile devices listed on said contact list;
d. installing said application upon accepting of said invitation to install said application;
e. means to repeat steps b-d for each contact on each of said networked mobile devices,
f. a server, adapted to provide said application running on said networked mobile device working in coordination with said server by means of an applications database, a client's database and an application distribution unit residing on said server, said client's database being subdivided into registered clients sub database and unregistered clients sub database, said applications database including all applications required to be installed in client's mobile networked devices, said application distribution unit being adapted to contact unregistered users in said unregistered clients sub database to invite some portion of said unregistered users to install application; and
g. whereby viral distribution of applications across a multitude of networked devices is achieved.

11. The system of claim 10, where said application comprises means for actions selected from the group consisting of: VoIP calls, regular cellular calls, sending SMS messages, sending Instant Messaging (IM) messages, sending photos, sending files, sharing data objects, and sending email.

12. The system of claim 10, additionally comprising means for performing tasks selected from a group consisting of: sending an SMS message; sending an SMS message containing a link to a location of said application allowing subsequent download of said application; sending an SMS message containing said application; sending an MMS message; sending an MMS message containing a link to a location of said application allowing subsequent download of said application; sending an MMS message containing said application; sending an email message; sending an email message containing a link to a location of said application allowing subsequent download of said application; sending an email message containing said application; sending an Instant Message; sending an Instant Message containing a link to a location of said application allowing subsequent download of said application; sending an Instant Message containing said application; sending a service message; sending a service message containing a link to a location of said application allowing subsequent download of said application; sending a service message containing said application; sending a WAP push message; sending a WAP push message containing a link to a location of said application allowing subsequent download of said application; sending a WAP push message containing said application; and directly sending said application from one networked mobile device to a second networked mobile device.

13. The system of claim 10, where said application is implemented on a subset of a programming language comprising functions that is valid on networked mobile devices.

14. The system of claim 10, where said server comprises means selected from a group consisting of: means for encryption and decryption of all communications used thereby; determining mobile device type and model; inviting new users to use said application; automatic account opening; application download via link from a source selected from the group consisting of: email message, SMS, MMS, Service message, and WAP push; placing calls anywhere locally and internationally; checking call cost and account balance; payment using means selected from the group consisting of :credit card, PIN, and calling card code; transfer of money from one user to another; sending and receiving SMS, Instant Messaging (IM), photos, emails, content, and files; redirecting calls to another number; sharing photos; sharing files and content, wherein useful additional networked connectivity is provided to users without requiring use of a personal computer (PC).

15. The system of claim 10, wherein said server 200 is additionally adapted to perform tasks selected from a group consisting of: receiving service requests via the internet 30; decrypting said requests; authenticating the customer using database 250; checking the customers' balance using balance check module 275; sending requested data back to networked mobile device software 100; sending a request to private branch exchange (PBX) to perform a callback to the customer; and directing calls to desired destination 50.

16. The system of claim 10, where said subset utilizes the original user interface (UI) and graphical user interface (GUI), available to a given networked mobile device.

17. The system of claim 16, where said application comprises means for actions selected from the group consisting of: placing VoIP calls, placing regular cellular calls, sending and receiving SMS messages, sending and receiving Instant Messaging (IM) messages, sending and receiving photos, sending and receiving files, and sending and receiving email.

18. The system of claim 17, wherein said server 200 is additionally provided with a billing engine 270 adapted to perform all requests requiring monetary exchanges, said billing engine adapted to compute and keep track of user balances, compute and add costs of placed calls, send SMS messages, and perform money transfers to other users.

\* \* \* \* \*